(12) United States Patent
Kinkel

(10) Patent No.: US 8,584,739 B2
(45) Date of Patent: Nov. 19, 2013

(54) ADIABATIC COOLING UNIT

(75) Inventor: Stephen W. Kinkel, Phoenix, AZ (US)

(73) Assignee: United Metal Products, Inc., Tempe, AZ (US)

( * ) Notice: Subject to any disclaimer, the term of this patent is extended or adjusted under 35 U.S.C. 154(b) by 1010 days.

(21) Appl. No.: 12/612,555

(22) Filed: Nov. 4, 2009

(65) Prior Publication Data

US 2011/0100602 A1    May 5, 2011

(51) Int. Cl.
| F25D 15/00 | (2006.01) |
| F25D 17/06 | (2006.01) |
| F25D 21/14 | (2006.01) |
| F28D 5/00 | (2006.01) |
| F28C 1/14 | (2006.01) |

(52) U.S. Cl.
USPC .............. 165/104.13; 62/94; 62/285; 62/310; 261/161

(58) Field of Classification Search
USPC ......................................... 165/104.13; 62/60
See application file for complete search history.

(56) References Cited

U.S. PATENT DOCUMENTS

| 3,410,339 | A | * | 11/1968 | Wiegandt | 165/104.13 |
| 3,777,811 | A | * | 12/1973 | Shcosinger | 165/104.13 |
| 4,076,771 | A | * | 2/1978 | Houx et al. | 261/159 |
| 4,457,358 | A | * | 7/1984 | Kriege et al. | 165/50 |
| 4,623,494 | A | * | 11/1986 | Gautier et al. | 261/161 |
| 4,738,305 | A | * | 4/1988 | Bacchus | 165/48.2 |
| 5,860,284 | A | * | 1/1999 | Goland et al. | 62/94 |
| 6,213,200 | B1 | * | 4/2001 | Carter et al. | 165/285 |
| 6,253,559 | B1 | * | 7/2001 | Kinkel et al. | 62/91 |
| 6,467,539 | B1 | * | 10/2002 | Medessi | 165/300 |
| 6,796,140 | B1 | * | 9/2004 | Weng et al. | 62/311 |
| 2005/0279115 | A1 | * | 12/2005 | Lee et al. | 62/314 |
| 2007/0151278 | A1 | * | 7/2007 | Jarvis | 62/310 |

* cited by examiner

*Primary Examiner* — Frantz Jules
*Assistant Examiner* — Henry Crenshaw
(74) *Attorney, Agent, or Firm* — Schmeiser, Olsen & Watts LLP; Jordan M. Meschkow; Charlene R. Jacobsen

(57) ABSTRACT

An adiabatic cooling unit (20) comprising a fluid conduit (26), a cooling cell (28), and a building-cooling unit heat exchanger (30) is provided. A cooling fluid (24) flows from the building-cooling unit heat exchanger (30) to the cooling cell (28) and returns to the building-cooling unit heat exchanger (30) through the fluid conduit (26). The cooling cell (28) transfers latent heat from the cooling fluid (24) to the air (22) flowing through the adiabatic cooler unit (20). The building-cooling unit heat exchanger (30) is a heat exchanger permitting the transfer of heat from a fluid (34) flowing through a building (36) and the cooling fluid (24). Additional heat exchangers (46) may be used between the cooling cell (28) and the building-cooling unit heat exchanger (30) to further cool the cooling fluid (24) prior to the cooling fluid (24) reducing the temperature of the fluid (34) flowing through the building (36).

10 Claims, 3 Drawing Sheets

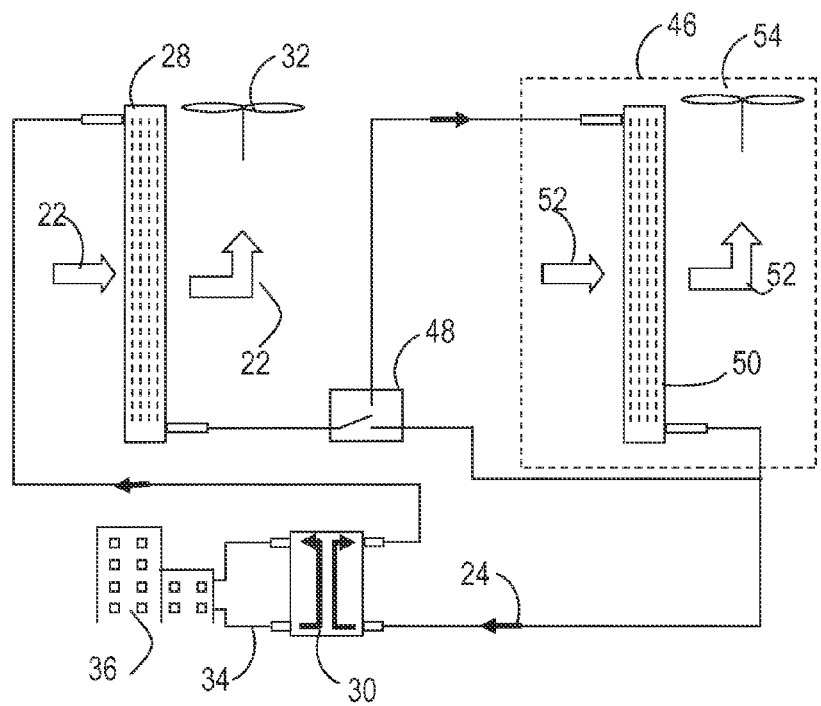
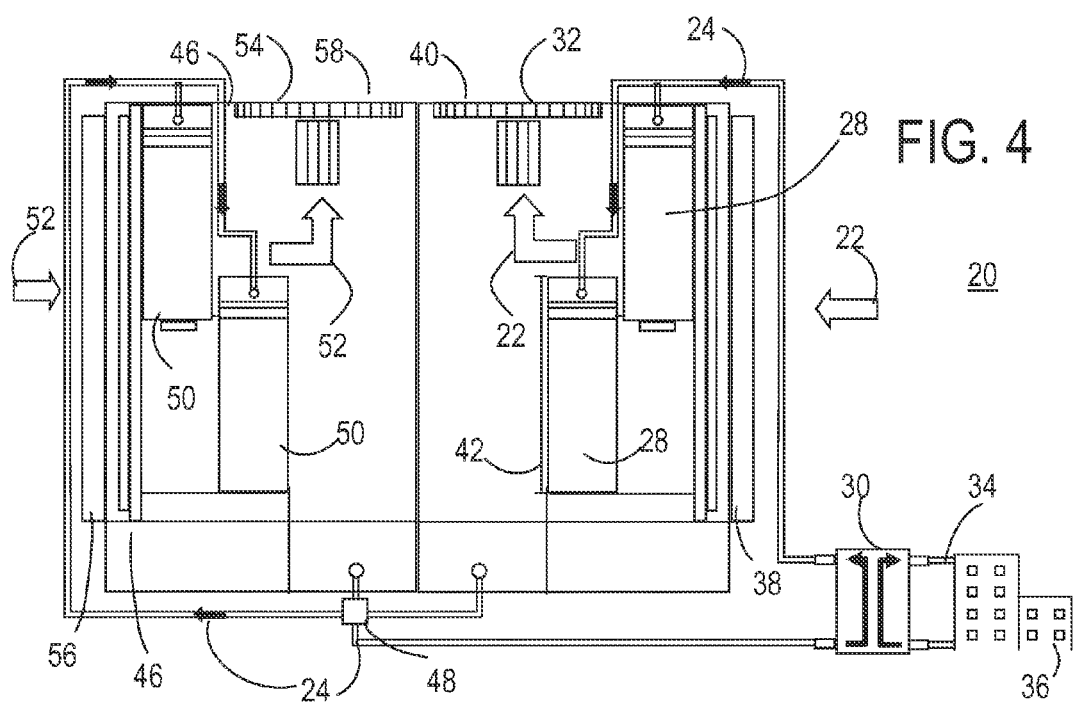

ADIABATIC COOLING UNIT

TECHNICAL FIELD OF THE INVENTION

The present invention relates to the field of cooling towers. More specifically, the present invention relates to fluid cooling towers.

BACKGROUND OF THE INVENTION

Cooling towers have traditionally been used to reduce the temperature of fluids and air that flow through a building. Traditional methods for cooling fluids that will ultimately cool the building interior use a transfer of heat between air and a fluid, and result in a coolant temperature reduction of approximately 7-8°. The air is then released to the atmosphere, and the cooled fluid is then used to cool the building. This cooling is often done by cooling the interior air.

Although some electrical devices, such as computers and computer networks, use the temperature of surrounding air to aid in cooling, other devices use direct contact between a cooling fluid and the components to efficiently reduce the heat. With the direct contact between the cooling fluid and the heated components, the cooling fluid is able to remove a greater amount of heat, as minimal cooling is lost to the air.

The level of cooling provided by the cooling fluid greatly affects the efficiency of these systems. Outside air temperature is a gauge to determine how much cooling fluid can be produced. As the coolant is cooled by air flowing through the cooling system, the transfer of heat from coolant to the air is limited both by the temperature of coolant as compared to the air and the chemical characteristics of the coolant.

Refrigerant is often used in systems that require the cooling of an internal space. Traditionally refrigerant gas has been used as a coolant in cooling towers to transfer heat between the fluid flowing through the building interior and air. The gaseous nature of the coolant may increase the amount of heat that the coolant absorbs, however a refrigerant gas is also limited in how much it can be cooled, some cooling effect of the air will be lost in the heat exchanging medium. Furthermore, the use of refrigerant increases the costs of installing and maintaining these cooling systems.

Accordingly what is needed is a system and method for cooling fluid that flows through interior spaces in a variety of climates.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a block diagram of an adiabatic cooler unit in accordance with an alternative preferred embodiment of the present invention;

FIG. 4 shows a plan view depicting an adiabatic cooler unit in accordance with an alternative preferred embodiment of the present invention;

DETAILED DESCRIPTION OF THE PREFERRED EMBODIMENTS

Figure 1:
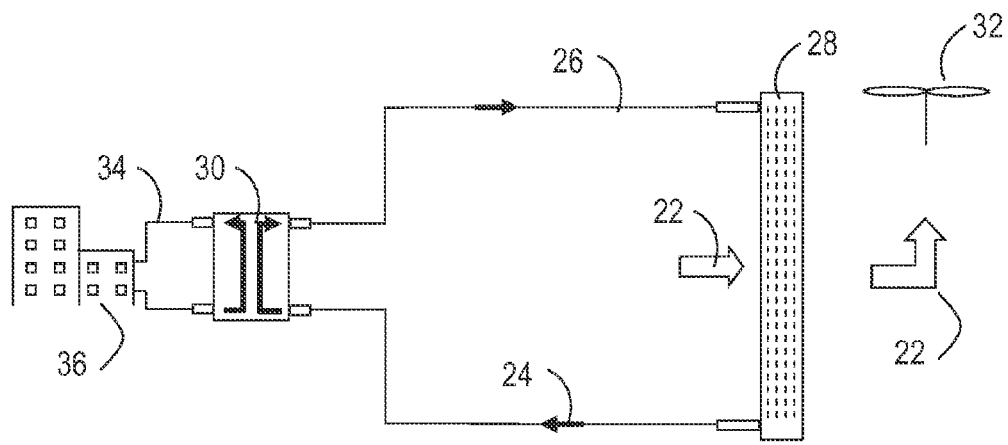
FIG. 1 shows a block diagram of an adiabatic cooler unit in accordance with a preferred embodiment of the present invention.

FIG. 1 is a block diagram of an adiabatic cooler unit 20. Adiabatic cooler unit 20 uses an air 22 to reduce the temperature of a cooling fluid 24 flowing through a fluid conduit 26 in adiabatic cooler unit 20. Fluid conduit 26 connects a cooling cell 28 and a building-cooling unit heat exchanger 30 within adiabatic cooler unit 20. Cooling fluid 24 is pumped through fluid conduit 26, from building-cooling unit heat exchanger 30, to cooling cell 28, and returns to building-cooling unit heat exchanger 30 by a pump (not shown).

Cooling cell 28 is configured to remove heat from cooling fluid 24, transferring it to air 22 flowing through cooling cell 28 of adiabatic cooler unit 20. Cooling cell 28 can be a direct exchanger, or any other heat transferring medium that will permit the transfer of heat from cooling fluid 24 to air 22. In an embodiment in which cooling cell 28 is a direct exchanger, latent heat is transferred between cooling fluid 24 and air 22. The transfer of latent heat does not increase the temperature of air 22 flowing through cooling cell 28, but increases the moisture content of air 22. This removal of latent heat reduces the temperature of cooling fluid 24 to within 2-3° of wet bulb temperature of air 22. In one embodiment, air 22 is outside air flowing into adiabatic cooler unit 20. In an alternate embodiment, air 22 is received from a source outside adiabatic cooler unit 20. In this embodiment, the temperature of air 22 may be altered to be a different temperature than outside air. After flowing through cooling cell 28, air 22 is blown out of adiabatic cooler unit 20 by a fan 32.

Building-cooling unit heat exchanger 30 is configured to permit the exchange of heat between a fluid 2 flowing through a building 4 and cooling fluid 24. When building fluid 34 flows through building-cooling unit heat exchanger 30, building fluid 34 has a temperature above the wet bulb temperature of air 22. Heat in building fluid 34 is transferred to cooling fluid 24 through any traditional means of heat transfer between fluids in building-cooling unit heat exchanger 30. It is desirable to reduce the temperature of building fluid 34 to be within 3-4° of wet bulb temperature, when the heat in building fluid 34 is transferred to cooling fluid 24.

Figure 2:
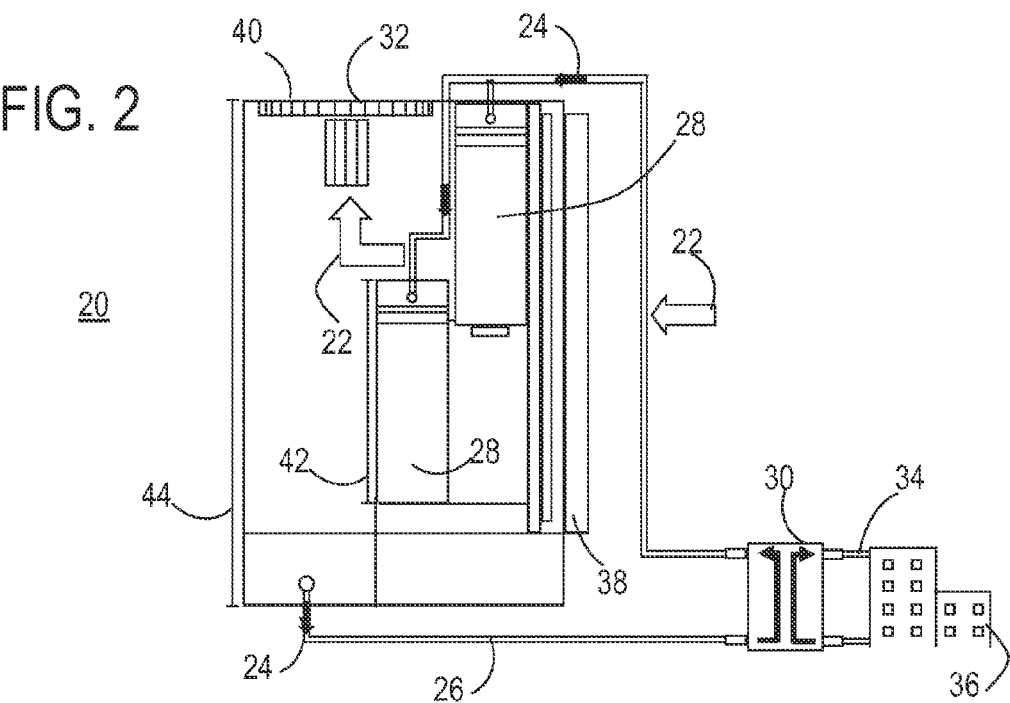
FIG. 2 shows a plan view depicting an adiabatic cooler unit in accordance with an alternative preferred a preferred embodiment of the present invention.

FIG. 2 is a plan view of the embodiment of adiabatic cooler unit 20 shown in FIG. 1. Air 22 enters through an air inlet 38, passes through cooling cell 28 and is then blown out by fan 32 through an air outlet 40. Adiabatic cooler unit 20 may be constructed with one cooling cell 28 or more than one cooling cell 28. If more than one cooling cell 28 is used, fluid conduits 26 from each of the more than one cooling cell 28 may join to form a single fluid conduit 26 to direct flow of cooling fluid 24 through common building-cooling unit heat exchanger 30 where heat is transferred from building fluid 34 to cooling fluid 24. In one embodiment, more than one cooling cell 28 is used, and cooling cells 28 are arranged in a step-like formation. In this embodiment, each cooling cell 28 has a height 42 and each cooling cell 28 is arranged within adiabatic cooler unit 20 such that the cooling from air 22 is maximized for cooling fluid 24. Height 42 is determined based upon many factors including the desired level of cooling and the capacity of cooling fluid 24 flowing through fluid conduit 26. The number of cooling cells 28 of height 42 that can be accommodated by adiabatic cooler unit 20 having a height 44 is then determined. The cooling cells 28 are then arranged by first placing the cooling cell 28 which is to be placed nearest air inlet 38. From this position, consecutive cooling cells 28 are arranged to be in a step pattern, with the previous cooling cell 28 being placed immediately below and adjacent to the current cooling cell 28. Although FIG. 2 shows only one adiabatic cooler unit 20 as described in FIG. 1, it should be noted that multiple adiabatic cooler units 20 may be put such that air inlets 38 face away from each other and air outlets 40 are proximal. By having more than one such adiabatic cooler unit 20, the amount of cooling fluid 24 flowing through the system of adiabatic cooler units 20 increases, providing more cooled cooling fluid 24 to reduce the temperature of building fluid 34.

Although an adiabatic cooler with a cooling cell 28 can reduce the temperature of cooling fluid 24, the lowest temperature that can be attained adiabatically for cooling fluid 24 is limited by the wet bulb temperature of air 22. This is because the wet bulb temperature is the temperature of a volume of air that has been cooled adiabatically to saturation at a constant pressure. Further reduction of the temperature of cooling fluid 24 can be obtained by reducing the wet-bulb temperature of air 22. A cooler cooling fluid 24 is desirable, as building-cooling unit heat exchanger 30 can more efficiently transfer heat from building fluid 34 to cooling fluid 24 the larger the temperature difference between building fluid 34 and cooling fluid 24 is.

The greater reduction of temperature of cooling fluid 24 can be done by removing the heat in air 22 without increasing the humidity of air 22. Adiabatic cooling unit 20 may be provided with air 22 that has been cooled by an outside source, or adiabatic cooling unit 20 may perform the cooling of air 22 itself before air 22 flows through cooling cell 28.

FIG. 3 is a block diagram of an alternative embodiment of adiabatic cooler unit 20. In this embodiment, adiabatic cooler unit 20 includes a heat exchanger 46 and a cooling fluid control valve 48 in addition to cooling cell 28 and building-cooling unit heat exchanger 30. Heat exchanger 46 may be any other device used to alter the temperature of cooling fluid 24. Cooling fluid control valve 8 is a valve that can direct the flow of cooling fluid 24 through fluid conduit 26 to permit the flow of cooling fluid 24 from cooling cell 28 to heat exchanger 46, or to direct flow of cooling fluid 24 directly from cooling cell 28 to building-cooling unit heat exchanger 30. In the embodiment depicted in FIG. 3, heat exchanger 46 includes a direct exchanger 50. In this embodiment, when cooling fluid valve 48 directs flow to heat exchanger 46, cooling fluid 24 flows from cooling cell 28 through heat exchanger 46 to building-cooling unit heat exchanger 30. Air 52 flows through direct exchanger 50, comes in direct physical contact with cooling fluid 24, and is pulled out of adiabatic cooler unit 20 by fan 54. The direct physical contact between cooling fluid 24 and air 52 causes the extraction of latent heat from cooling fluid 24, reducing the temperature of cooling fluid 24 without altering the temperature, but increasing the moisture content, of air 52. In one embodiment, the temperature of cooling fluid 24 is reduced to within 2-3° of wet bulb temperature.

In order for direct exchanger 50 to cool cooling fluid 24 to a lower temperature than when it exited cooling cell 28, air 52 flowing through direct exchanger 50 has a lower wet bulb temperature than air 22. This lower wet bulb temperature can be obtained by reducing the temperature of air 52 without increasing the moisture content of air 52. This temperature reduction may be performed outside of heat exchanger 46.

FIG. 4 is a plan view of the embodiment of adiabatic cooler unit 20 shown in FIG. 3. Adiabatic cooler unit 20 may be constructed with one cooling cell 28 and heat exchanger 46 set or more than one cooling cell 28 and heat exchanger 46 set. If more than one cooling cell 28 and heat exchanger 46 set is used, all cooling cell 28 and heat exchanger 46 set may share a common building-cooling unit heat exchanger 30 where heat is transferred from building fluid 34 to cooling fluid 24. Cooling cell 28 can be arranged in any position relative to heat exchanger 46. In one embodiment, cooling cell 28 is positioned such that air inlet 38 for cooling cell 28 is distal from a second air inlet 56 for heat exchanger 46, and air outlet 40 for cooling cell 28 is proximal to a second air outlet 58 for heat exchanger 46.

In this embodiment, heat exchanger 46 (shown in FIG. 3) includes direct exchanger 50 which receives cooled air 52 and cools cooling fluid 24 by removing the latent heat from cooling fluid 24 and reducing the temperature closer to the wet bulb temperature of the cooled air 52. In one embodiment, more than one cooling cell 28 is used. In this embodiment, the number of cooling cells 28 and the number of heat exchangers 46 used are the same. Cooling cells 28 are arranged in a step-like formation, and heat exchangers 46 are also arranged in a step-like formation. In this embodiment, each cooling cell 28 and heat exchanger 46 set is arranged relative to other cooling cell 28 and heat exchanger 46 sets within adiabatic cooler unit 20 to maximize cooling of cooling fluid 24.

Figure 5:
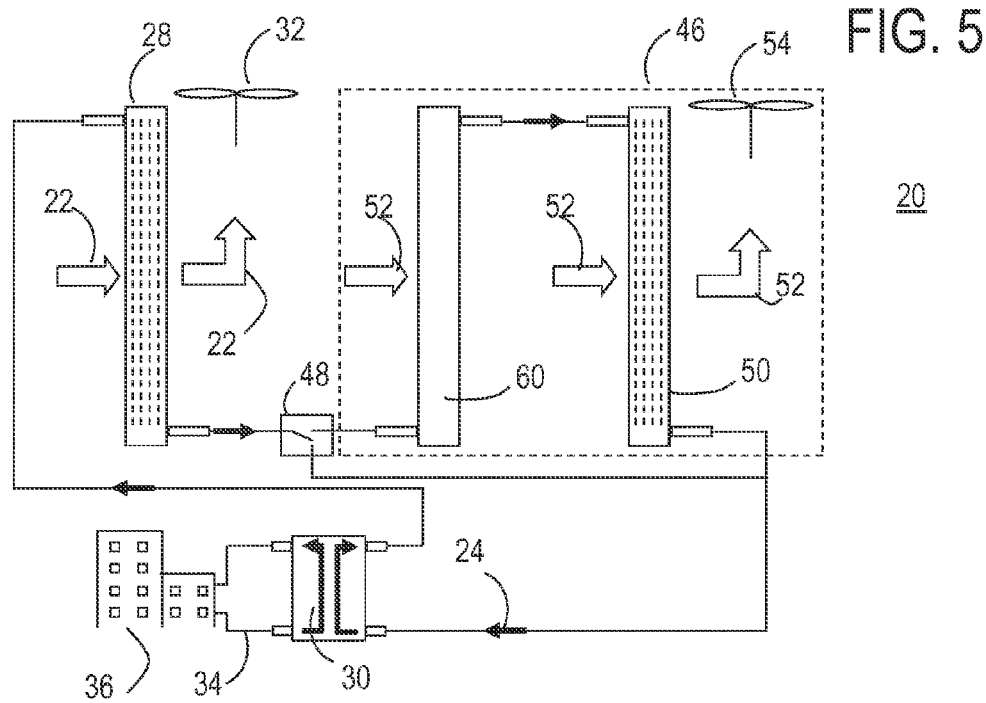
FIG. 5 shows a block diagram of an adiabatic cooler unit in accordance with an alternative preferred embodiment of the present invention.

FIG. 5 is a block circuit diagram of an alternative embodiment of adiabatic cooler unit 20. In this embodiment, heat exchanger 46 is a combination of direct exchanger 50 and an indirect exchanger 60. The use of an indirect/direct exchanger 46 cools air 52 within adiabatic cooler unit 20 without increasing the humidity prior to using cooled air 52 to reduce the temperature of cooling fluid 24. Cooling fluid 24 flows from cooling cell 28 to indirect exchanger 60. Air 52 flows through indirect exchanger 60 and heat is exchanged between cooling fluid 24 and air 52, raising the temperature of cooling fluid 24, but reducing both the dry and wet bulb temperature of air 52. This heated cooling fluid 24 then flows through direct exchanger 50. As discussed earlier, cooling fluid 24 comes in direct contact with air in direct exchanger 50. In this embodiment, cooling fluid 24 comes in direct contact with the air that has been previously cooled in indirect exchanger 60. Direct exchanger 50 removes the latent heat from cooling fluid 24, once again reducing the temperature of cooling fluid 24. In one embodiment, the temperature of cooling fluid 24 is reduced to within 2-3° of wet bulb temperature. In this embodiment, the wet bulb temperature of air 52 when air 52 flows through direct exchanger 50 is lower than that of air 52 when air 52 entered indirect exchanger 60, as the heat exchange between air 52 and cooling fluid 24 in indirect exchanger 60 reduced the wet bulb temperature.

Figure 6:
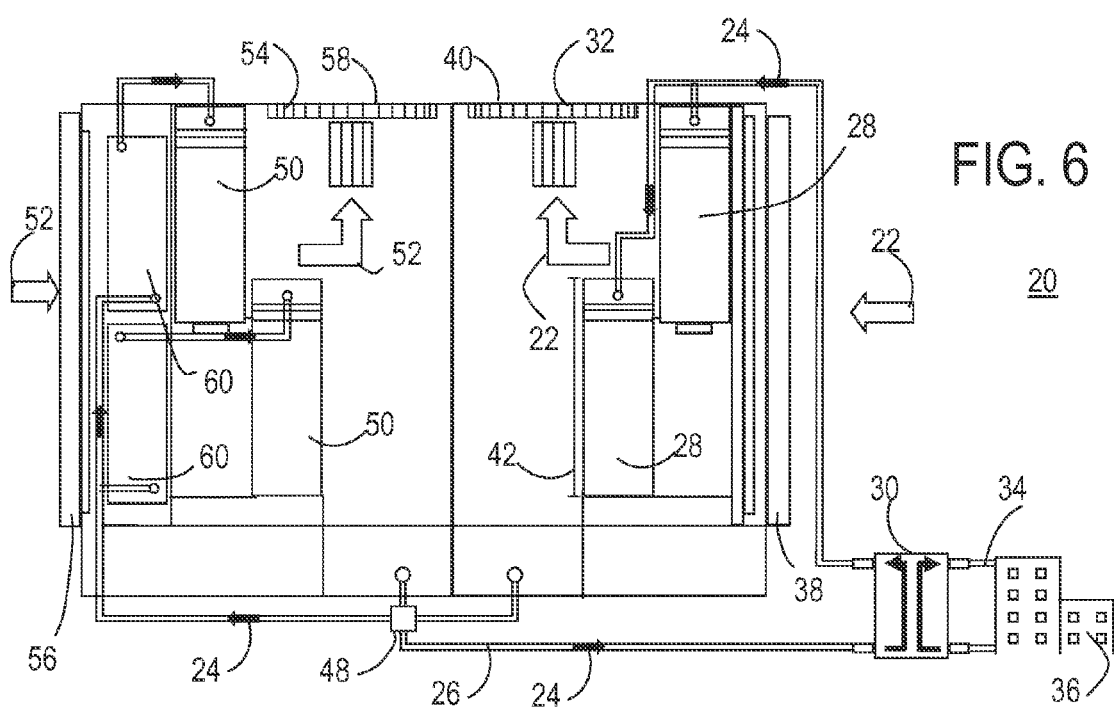
FIG. 6 shows a plan view depicting an adiabatic cooler unit in accordance with an alternative preferred embodiment of the present invention.

FIG. 6 is a plan view of the embodiment of adiabatic cooler unit 20 shown in FIG. 5. Air inlet 38 receives air 22 and air outlet 40 removes air 22 from cooling cell 28. Air inlet 56 receives air 52 and air outlet 58 removes air 52 from heat exchanger 46 (shown in FIG. 5). In this embodiment, heat exchanger 46 comprises both an indirect exchanger 60 and a direct exchanger 50 in which indirect exchanger 60 cools air 52 without altering the humidity of air 52, reducing the wet bulb temperature. Cooled air 52 from indirect exchanger 60 is then passed through direct exchanger 50, wherein direct exchanger 50 cools cooling fluid 24 as discussed above. In the embodiment specifically depicted in FIG. 6, more than one cooling cell 28 and heat exchanger 46 set is used, and cooling cells 28 are arranged in a step-like formation.

Indirect exchangers 60 and direct exchangers 50 can be arranged in different formations. In the embodiment specifically depicted in FIG. 6, indirect exchangers 60 are arranged one directly below the other and direct exchangers 50 are arranged in a step-like formation similar to the arrangement of cooling cells 28. In an alternate embodiment, indirect exchangers 60 and direct exchangers 50 are both arranged in a step-like formation. In both of these embodiments, each cooling cell 28 and heat exchanger 46 set is arranged relative to other cooling cell 28 and heat exchanger 46 sets within adiabatic cooler unit 20 to maximize cooling of cooling fluid 24.

Adiabatic cooler unit 20 may be used as a stand-alone unit, or as an optional add-on to an air-conditioning device. As an optional add-on to an air-conditioning device, only cooling cell 28 and building-cooling unit heat exchanger 30 need be used. As air 22 from cooling cell 28 can be further harvested and conditioned for alternate uses, it is not necessary to additionally include heat exchanger 46. One skilled in the art will recognize that a heat exchanger 46 may also be used to further condition cooling fluid 24 and condition air 52 to minimize temperature of both cooling fluid 24 and air 52. Furthermore, although air 22 flowing through cooling cell 28 and air 52 flowing through heat exchanger 46 have been shown to be both drawn from the same source, those skilled in the art will recognize that cooling cell 28 and heat exchanger 46 of adiabatic cooler unit 20 can be arranged such that air 52 flowing through heat exchanger 46 can be received from cooling cell 28.

When used as a stand-alone unit, adiabatic cooler unit 20 has a cooling cell 28 and building-cooling unit heat exchanger 30, and may include one or more heat exchangers 46. The use of heat exchangers 46 may be affected by many factors including, but not limited to, the level of temperature drop needed, and the temperature of air 22 where adiabatic cooler unit 20 will be installed. If it is not necessary to reduce the temperature of cooling fluid 24 below the wet bulb temperature of air 22, adiabatic cooler unit 20 may not employ any heat exchangers 46. In the embodiment where a temperature reduction of cooling fluid 24 below the wet bulb temperature of air 22 is needed, it will be necessary to use heat exchangers 46. The use of direct exchangers 50 or both indirect exchangers 60 and direct exchangers 50 can be determined from where air 52 is entering heat exchanger 46. If the air 52 entering heat exchanger 46 has a lower wet bulb temperature than that of air 22 entering cooling cell 28, and the lower wet bulb temperature is at least 2-3° lower than the desired cooling fluid 24 temperature, then a direct exchanger 50 is sufficient. However, if it is necessary to reduce the wet bulb temperature of air 52 prior to entering direct exchanger 50, an external source for reducing the wet bulb temperature of air 52, or combination of indirect exchanger 60 and direct exchanger 50 may be used.

In summary, the present invention teaches cooling a fluid 34 flowing through a building 36 through the use of an adiabatic cooler unit 20. Wet bulb temperature of air 22 is used to reduce the temperature of cooling fluid 24 flowing through adiabatic cooler unit 20. Cooled cooling fluid 24 is then used to reduce the temperature of building fluid 34.

The temperature of cooling fluid 24 may be reduced through the use of a direct exchanger 50 or a combination of an indirect exchanger 60 and a direct exchanger 50. Direct exchangers 50 remove the latent heat of cooling fluid 24 by coming in direct contact with cooling fluid 24. The removal of latent heat will alter the humidity of the air 52 that is released from direct exchanger 50; however the temperature of air 52 flowing through direct exchanger 50 is not changed. The use of a combination of an indirect exchanger 60 and a direct exchanger 50 change both the humidity and temperature of air 52 that is released from the heat exchanger 46. The indirect exchanger 60 reduces both the dry bulb and wet bulb temperatures of air 52 entering the heat exchanger 46 by transferring heat from air 52 to cooling fluid 24. This cooled air 52 is then used in direct exchanger 50 to remove the latent heat from cooling fluid 24. The resulting cooled cooling fluid 24 is then used to cool building fluid 34.

Although the preferred embodiments of the invention have been illustrated and described in detail, it will be readily apparent to those skilled in the art that various modifications may be made therein without departing from the spirit of the invention or from the scope of the appended claims.

What is claimed is:

1. An adiabatic cooler unit for cooling a building fluid comprising:
   a cooling cell configured to cool a cooling fluid by transferring heat from said cooling fluid to first supply air;
   a heat exchanger configured to cool said cooling fluid by transferring heat from said cooling fluid to second supply air, wherein said heat exchanger comprises a direct exchanger configured to accept said second supply air and remove heat from said cooling fluid using said second supply air;
   a building-cooling unit heat exchanger configured to cool said building fluid by transferring heat from said building fluid to said cooling fluid; and
   a fluid conduit configured to direct the flow of said cooling fluid from said building-cooling unit heat exchanger, through said cooling cell, and back to said building-cooling unit heat exchanger, wherein:
      said cooling fluid flows from said building-cooling unit heat exchanger to said cooling cell through said fluid conduit;
      said cooling fluid flows from said cooling cell to said heat exchanger through said fluid conduit; and
      said cooling fluid flows from said heat exchanger directly to said building-cooling unit heat exchanger through said fluid conduit, and wherein said cooling fluid flowing out of said heat exchanger bypasses said cooling cell.

2. An adiabatic cooler unit as claimed in claim 1 wherein said cooling cell comprises:
   a heat transferring medium configured to accept said first supply air and cool said cooling fluid with said first supply air;
   wherein said first supply air does not physically contact said cooling fluid.

3. An adiabatic cooler unit as claimed in claim 1 wherein said cooling cell comprises:
   a direct exchanger configured to accept said first supply air and cool said cooling fluid with said first supply air;
   wherein said first supply air comes in direct physical contact with said cooling fluid.

4. An adiabatic cooler unit as claimed in claim 1 wherein said heat exchanger further comprises:
   an indirect exchanger configured to accept said second supply air and remove heat from said second supply air using said cooling fluid;
   wherein:
      said second supply air is cooled in said indirect exchanger prior to entering direct exchanger; and
      said cooling fluid is heated in indirect exchanger prior to entering said direct exchanger.

5. An adiabatic cooler unit for cooling a building fluid comprising:
   a cooling cell;
   an indirect exchanger;
   a direct exchanger;
   a building-cooling unit heat exchanger; and a fluid conduit configured to direct the flow of a cooling fluid between said cooling cell, said indirect exchanger, said direct exchanger, and said building-cooling unit heat exchanger;

wherein:

said cooling fluid flows from said building-cooling unit heat exchanger to said cooling cell through said fluid conduit;

said cooling fluid flows through said cooling cell, and heat from said cooling fluid transfers to first supply air thereby cooling said cooling fluid;

said cooled cooling fluid flows from said cooling cell to said indirect exchanger, a second air supply flows through said indirect exchanger, and said cooling fluid cools said second air supply;

said cooled cooling fluid flows from said indirect exchanger to said direct exchanger, said cooled second air supply further cools said cooling fluid in said direct exchanger; and said cooled cooling fluid flows from said direct exchanger directly to said building-cooling unit heat exchanger bypassing said cooling cell, wherein said cooling fluid from said direct exchanger cools said building fluid.

6. An adiabatic cooler unit as claimed in claim 5 wherein said second supply air does not come in direct physical contact with said cooling fluid in said indirect exchanger.

7. An adiabatic cooler unit as claimed in claim 5 wherein said second supply air comes in direct physical contact with said cooling fluid in said direct exchanger.

8. An adiabatic cooler unit as claimed in claim 5 wherein said cooling cell comprises:

a heat transferring medium configured to accept said first supply air and cool said cooling fluid with said first supply air;

wherein said first supply air does not physically contact said cooling fluid.

9. An adiabatic cooler unit as claimed in claim 5 wherein said cooling cell comprises:

a direct exchanger configured to accept said first supply air and cool said cooling fluid with said first supply air;

wherein said first supply air comes in direct physical contact with said cooling fluid.

10. An adiabatic cooler unit as claimed in claim 1 further comprising:

a first air inlet in fluid communication with said cooling cell;

a first fan;

a first air outlet in communication with said cooling cell, wherein said first supply air enters through said first air inlet, passes through said cooling cell, and is blown out of said adiabatic cooler unit by said first fan through said first air outlet;

a second air inlet in fluid communication with said heat exchanger;

a second fan; and a second air outlet in communication with said heat exchanger, wherein said second supply air enters through said second air inlet, passes through said cooling cell, and is blown out of said adiabatic cooler unit by said second fan through said second air outlet.

* * * * *